United States Patent Office 3,281,434
Patented Oct. 25, 1966

3,281,434
1,4 - DIHYDROXY - 5 - BUTYLAMINO - 8 - (3 - TRIMETHYLAMINO - PROPYLAMINO) - ANTHRAQUINONE METHYLSULFATE
Melvin N. Turetzky, Wayne, and Leon Katz, Springfield, N.J., assignors to General Aniline & Film Corporation, New York, N.Y., a corporation of Delaware
No Drawing. Filed June 19, 1963, Ser. No. 288,872
The portion of the term of the patent subsequent to Mar. 3, 1981, has been disclaimed
2 Claims. (Cl. 260—380)

This invention is a continuation-in-part of our application Serial No. 1,181, filed January 8, 1960, now U.S. Patent 3,123,605.

The present invention relates to certain basic anthraquinone dyestuffs and to a method for producing the same. More particularly, the present invention relates to the preparation of novel anthraquinone-substituted quaternary amines.

An important object of this invention is the provision of a novel anthraquinone dyestuff which is particularly suitable for dyeing synthetic fibers having a basis of polyacrylonitrile in bright, full blue-green shades of excellent light fastness.

A further object of this invention is to provide a water-soluble anthraquinone dyestuff which dyes synthetic fibers, particularly those having a basis of polyacrylonitrile, directly from an aqueous bath without the aid of conventional dispersing agents.

Other objects and advantages of this invention will appear from the following detailed description.

The dyestuffs of this invention correspond to the formula

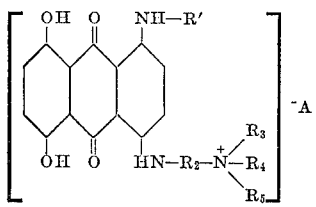

wherein R′ represents an alkyl group of 1 to 6 carbon atoms, $R^2$ represents an alkylene group of 2 to 4 carbon atoms and $R^3$ and $R^4$ each represent an alkyl group of 1 to 4 carbons or $R^3$ and $R^4$ together may represent a bivalent alkylene radical of 4 to 5 atoms including —O— interrupted alkylene and $R^5$ represents an alkyl group of 1–3 carbon atoms and A is an anion.

The new dyestuffs of this invention are obtained by reacting 2,3-dihydro-1,4,5,8 tetrahydroxy anthraquinone with an equimolar amount of an amine of the formula

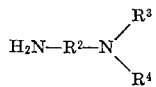

wherein $R^2$, $R^3$ and $R^4$ have the significance above set forth, for example:

N,N-diethylethylene diamine
N,N-dimethylethylene diamine
3-dimethylamino propylamine
3-diethylaminopropylamine
N-(3-amino propyl)morpholine
3-N,N-dibutylamino propylamine;

and an equimolar proportion of a primary alkyl amine of 1 to 6 carbon atoms.. We particularly prefer butyl amines since lower weight alkyl amines e.g., methyl amine, ethyl amine or propyl amines do not react as well at atmospheric pressure due to their boiling point, while higher amines, e.g., amyl amines and hexyl amines tend to reduce the water solubility of the final quaternized dyestuff.

The reaction is carried out in virtually any organic solvent, e.g., hydrocarbons, alcohols, ethers, ketones, esters, etc., specific examples of which are Benzene
Toluene
o- or m-Dichlorobenzene
Methanol
n-Butanol
Dioxane
Amyl acetate
Methyl isobutyl ketone
Ethylene glycol
Ethylene glycol dimethyl ether
Xylene
Trichlorobenzene
Monochlorobenzene
Ethanol
2-Ethylhexanol
Diacetone alcohol
Ethyl acetate
Methyl ethyl ketone
Methyl Cellosolve
Diethylene glycol Preferably chloro-hydrocarbon solvents are employed for the reaction for the reason which is set forth below.

In the second stage of the process the thus obtained anthraquinone amine product is treated with a quaternizing agent. Advantageously, use of a chloro-hydrocarbon solvent for the first stage permits the entire reaction mixture to be treated directly with the quaternizing agent, and the anthraquinone-substituted quaternary amine precipitates directly from this reaction mixture in relatively pure form.

Suitable quaternizing agents for the preparation of the instant dyestuffs comprise lower alkyl halides such as methyl, ethyl and propyl chlorides, bromides and iodides, and alkyl esters of strong acids such as dimethyl sulfate, ethyl-p-toluenesulfonate and the like.

The dyestuff of the present invention is water-soluble and dyes synthetic fibers directly from an aqueous bath even without the aid of conventional dispersing agents. While the dyestuff of the invention builds up to bright full blue-green shades of excellent light fastness on polyacrylonitrile fibers, they also yield good tinctorial results on other synthetic fibers such as polyester and polyamide fibers.

More specifically the reaction between the anthraquinone base and the amine is effected at reflux temperature, after which the quaternizing agent is passed into the reaction mixture until quaternization is complete. The reaction mixture may again be subjected to reflux temperature, if necessary.

The invention is illustrated but not limited by the following example in which the parts are by weight.

*Example*

To 400 parts of chlorobenzene is added 50 parts of 2,3-dihydro-1,4,5,8 tetrahydroxy anthraquinone. The mixture is heated to reflux and there is added in 1 hour 17 parts of 3-dimethylamino propylamine. The temperature is lowered to 90° C. and there is added 17 parts of n-butylamine. The reaction mixture is heated to reflux for 1 hour, then there is added 12 parts of nitrobenzene, and the refluxing continued for 1 hour longer. The condenser is now changed to distillation and the solvent distilled off in about 4 increments, each increment being replaced with an equal portion of fresh chlorobenzene until about 200 parts have been removed.

The mixture is then cooled to room temperature and a mixture of 50 parts dimethyl sulfate and 50 parts chlorobenzene added. After stirring for two hours, the product is filtered off and washed with chlorobenzene until the washings are colorless. The product is dried in a vacuum oven and there is obtained about 90 parts of a solid which is water-soluble. A water solution dyes polyacrylonitrile fibers in blue-green shades of excellent buildup and fastness to light.

Having thus disclosed the invention, what is claimed is:

1. An anthraquinone dyestuff corresponding to the formula

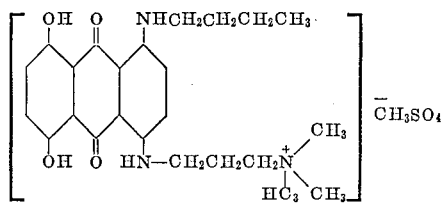

2. In a process for preparing an anthraquinone dyestuff the steps of heating to reflux a mixture of 2,3-dihydro-1,4,5,8 tetrahydroxy anthraquinone and chlorobenzene, adding 3-dimethylamino propylamine and n-butylamine, heating the resulting mixture to reflux, adding nitrobenzene and continuing the refluxing, distilling off the chlorobenzene and adding fresh chlorobenzene, cooling the reaction mixture to room temperature, adding a mixture of dimethyl sulfate and chlorobenzene with stirring, and filtering off the resulting product.

References Cited by the Examiner

UNITED STATES PATENTS 3,123,605   3/1964   Turetzky et al. ____ 260—380 X

FOREIGN PATENTS 807,241   1/1959   Great Britain.

LORRAINE A. WEINBERGER, *Primary Examiner.*

H. C. WEGNER, *Assistant Examiner.*